United States Patent [19]
Allison

[11] Patent Number: 5,847,348
[45] Date of Patent: Dec. 8, 1998

[54] METHOD AND APPARATUS OF USING A HIGH AMPERAGE TOOL ADAPTOR WITH AN ELECTRICAL DISCHARGE MACHINE

[75] Inventor: Samuel J. Allison, South Lebanon, Ohio

[73] Assignee: Makino Inc., Mason, Ohio

[21] Appl. No.: 759,731

[22] Filed: Dec. 6, 1996

[51] Int. Cl.⁶ .............................. H01R 4/50; B23H 1/00
[52] U.S. Cl. ........................................ 219/69.11; 439/348
[58] Field of Search ........................... 219/69.11, 69.15; 439/348; 901/30, 41

[56] References Cited

U.S. PATENT DOCUMENTS

| | | | |
|---|---|---|---|
| 3,614,370 | 10/1971 | Italo | 219/69.15 |
| 3,711,105 | 1/1973 | Johanson . | |
| 3,855,442 | 12/1974 | Check et al. . | |
| 4,428,639 | 1/1984 | Hillis . | |
| 4,636,135 | 1/1987 | Bancon | 901/41 |
| 4,638,141 | 1/1987 | Houman et al. . | |
| 4,647,748 | 3/1987 | Glassman . | |
| 4,814,573 | 3/1989 | Check et al. . | |
| 4,841,126 | 6/1989 | Graeber . | |
| 5,002,500 | 3/1991 | Zuccaro et al. | 439/348 |
| 5,219,376 | 6/1993 | Vinohradsky . | |
| 5,225,646 | 7/1993 | Chiang | 219/69.11 |
| 5,243,264 | 9/1993 | Takada et al. | 901/30 |
| 5,420,388 | 5/1995 | Girardin | 219/69.15 |

*Primary Examiner*—Geoffrey S. Evans
*Attorney, Agent, or Firm*—Dinsmore & Shohl LLP

[57] ABSTRACT

A tool adaptor which can be used with an electrode on electrical discharge machine having a current source and a C-axis controller for selectively rotating the electrode. The tool adaptor includes a tool holder for selectively and releasably securing the tool adaptor to said C-axis controller, a jig plate adapted for securing the electrode, an isolating assembly, including a spacer, interposed between the tool holder and the jig plate for preventing effective electrical and/or thermal communication between the jig plate and the tool holder. The tool adaptor also can include an electrical assembly for establishing and maintaining electrical communication between the jig plate and the current source, so that the tool adaptor is configured to permit selective rotational movement of the electrode. The electrical assembly may include a connector adapted for being selectively mountable around the C-axis controller, and being in electrical communication with the current source, and a shank (e.g., pin) being capable of establishing and maintaining electrical communication between the connector and the jig plate.

15 Claims, 6 Drawing Sheets

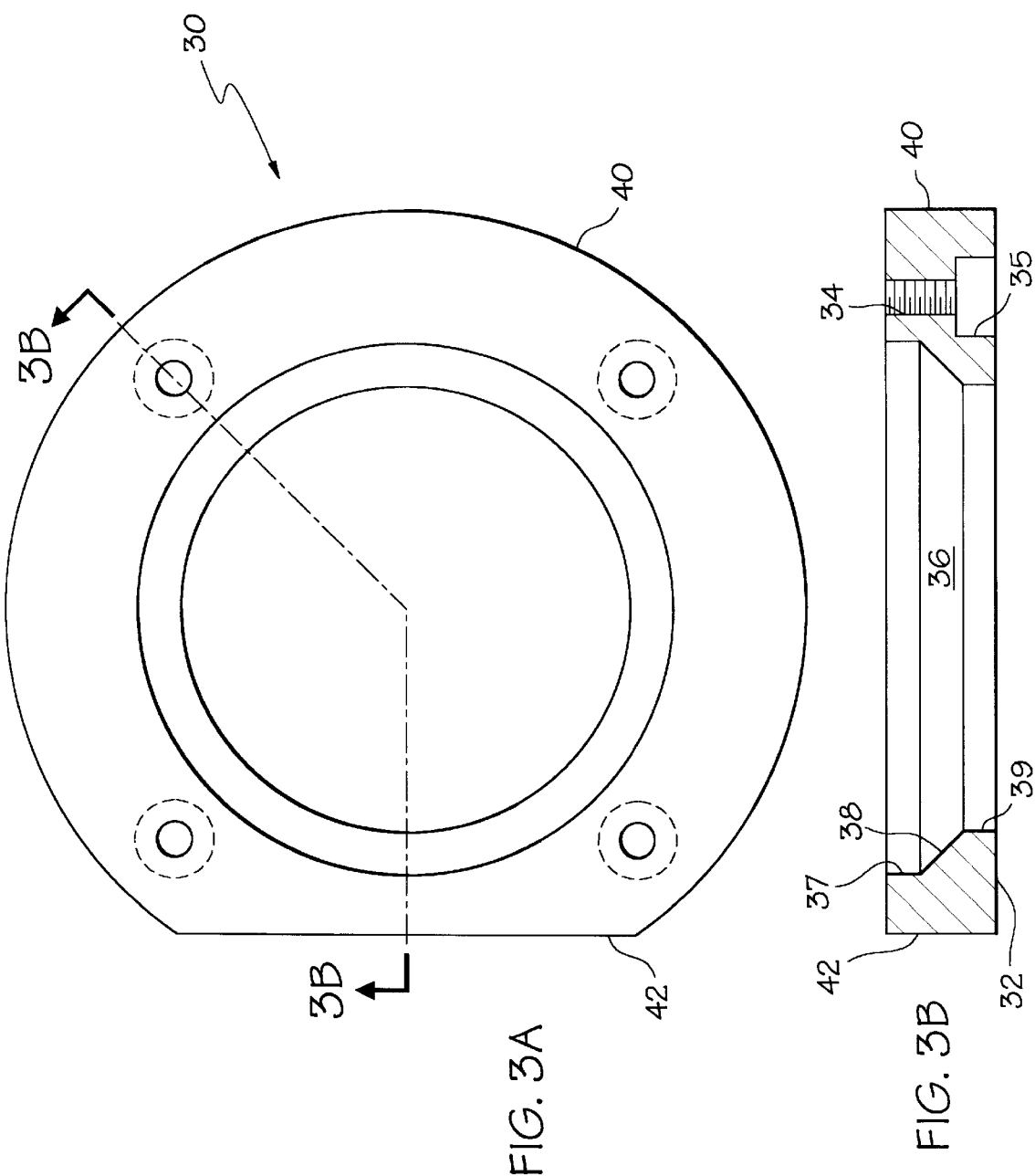

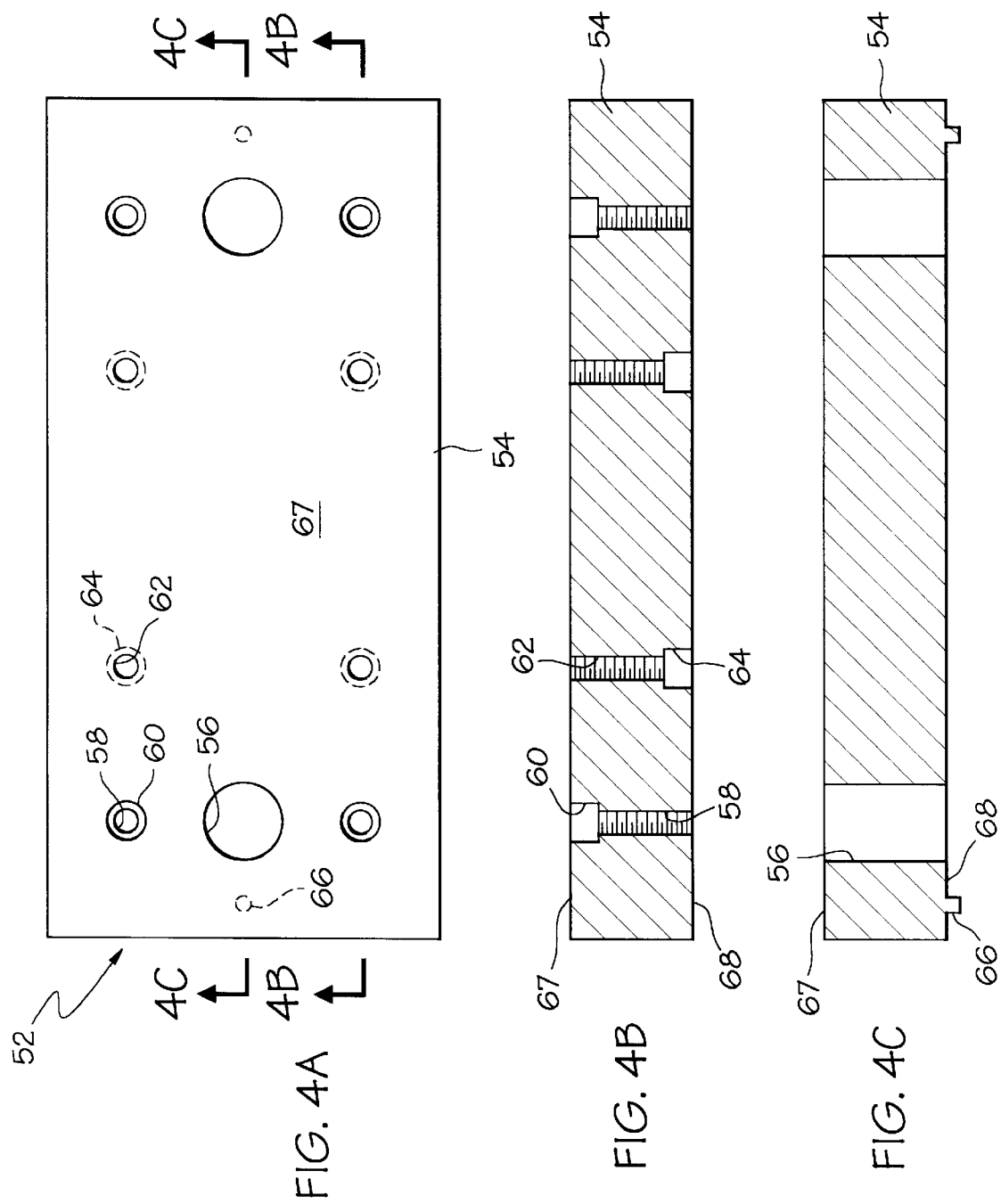

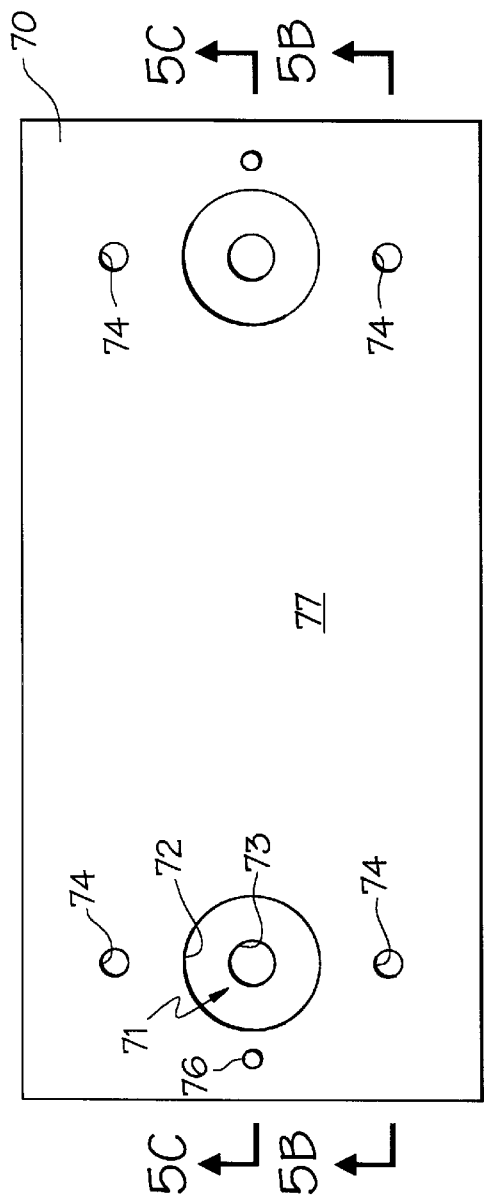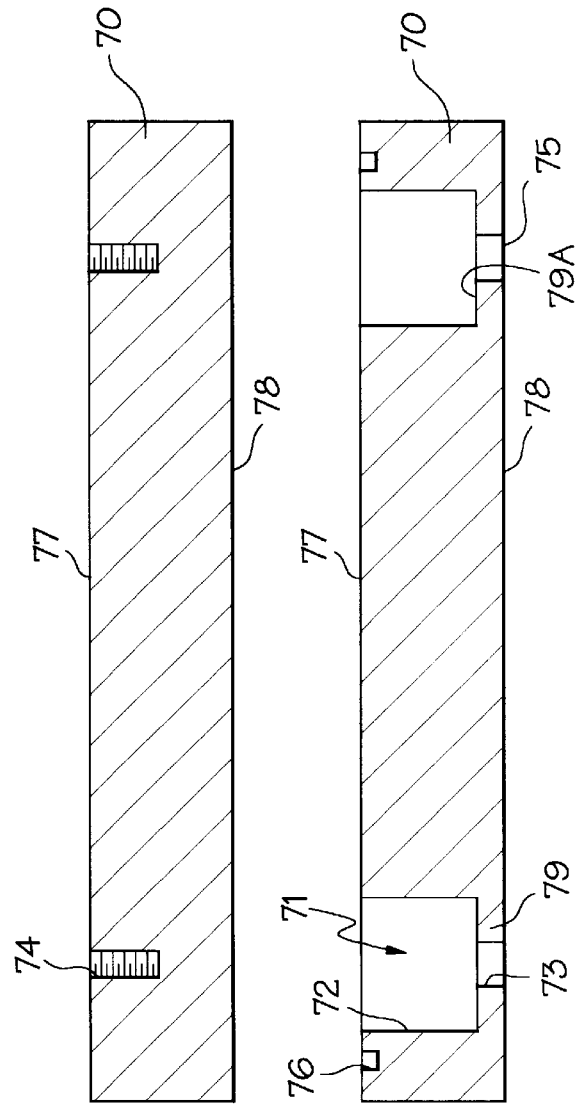

METHOD AND APPARATUS OF USING A HIGH AMPERAGE TOOL ADAPTOR WITH AN ELECTRICAL DISCHARGE MACHINE

TECHNICAL FIELD OF THE INVENTION

The present invention relates to a tool adaptor for using an electrode with an electrical discharge machine, and in particular, to a tool adaptor for use with an electrical discharge machine that effectively electrically and thermally isolates a C-axis controller from other components of the tool adaptor, the electrode and/or the current source.

BACKGROUND OF THE INVENTION

An electrical discharge machine (or EDM) is commonly used with an electrode to burn or form a cavity in a workpiece, such as a piece of metal, which in turn, can be used to manufacture plastic parts in the desired size, shape or pattern, or parts themselves. An electrode attached to a tool holder can be moved in close proximity to or adjacent the workpiece. In some regards, EDM is considered a nontraditional machining process because there is no tool force utilized, as the "cutting" tool actually is a specifically sized and configured electrode which typically does not touch or otherwise engage the workpiece. Instead, the electrode merely serves as a platform from which controlled sparking originates, and moves or jumps to the workpiece.

During the sparking process, electrons move or jump from the electrode to the workpiece and represent the force which causes removal of metal in the workpiece. The EDM process generally requires that both the electrode and workpiece be made of a material that conducts electric current. When the electrons strike the workpiece surface, energy is released which heats a small portion of the surface, and then melts it. In this process, a spark removes a very small amount of workpiece material. Continued heating of the workpiece (via continued electron bombardment) results in surface vaporization and over time, a cavity can be created. In order to form or create larger cavities in the workpiece, the tool cycle time can be quite long, and can extend for many hours. When the desired cavity is formed eventually, the electrode can move away from the workpiece, and then again can be moved in close proximity to or adjacent the workpiece for forming another cavity in the workpiece. This process can be repeated so that a workpiece includes a plurality of cavities.

In addition, EDM can offer numerous advantages in the forming of small diameter holes. EDM allows holes in workpieces to be formed regardless of the workpiece's hardness, so long as the material is electrically conductive and the spark can be moved or jumped from the electrode to the workpiece. When properly controlled, the EDM process is very accurate and has a high degree of stability. Because there is no direct contact between the electrode and the workpiece, no mechanical forces of the type found in conventional machining (e.g., drilling, milling, boring, etc.) are in use. As a result, extremely thin and/or fragile parts can be successfully and accurately formed using an EDM process with a properly sized and configured electrode.

With the use of a computer programmable EDM, a new technology has developed which allows economical production of complex shapes which can be accomplished by infinitely repeating a set of procedures in a workpiece. A C-axis controller, or other device or assembly for rotating an electrode, is capable of being added to the EDM and can rotate the electrode to change the electrode's position for additional cavity forming operations. Thus, additional cavities can be accurately and automatically formed in a workpiece with unattended operations (i.e., without operators being involved).

As cavity forming operations for a single cavity can extend for rather lengthy periods of time, techniques have been developed in EDMs to more quickly form or burn cavities for decreasing tool cycle time. In some instances, where the electrode is provided as a cathode, and thus negatively charged, and the workpiece is provided as an anode, and thus positively charged, workpiece removal rate can be increased. Additionally, increasing the amperage of the direct current source also can increase the metal removal rate, thus decreasing the tool cycle time. However, previous tool holders or adaptors have been placed in effective electrical and/or thermal communication with the C-axis controller. When increased amperages, such as greater than about 60 amps, have been utilized, the resulting electrical current and residual thermal energy from the temperature generated or created at the electrode/workpiece interface (around 3,000° F. to 5,000° F.) can damage or even destroy the inner workings of the C-axis controller.

Attempts have been made to protect the C-axis controller when using increased amperage. To effectively thermally and/or electrically isolate the C-axis controller from other portions of the EDM machine, a tool holder and the electrode, an external cover can be manually placed around or encase the C-axis controller and can be used to protect the C-axis controller from damage as a result of being in effective electrical communication with other portions of the EDM machine. However, these external covers have several significant drawbacks. First, the external cover placed around the C-axis controller effectively eliminates the ability to use the C-axis controller. Although a ram or other device can still lower and raise vertically the electrode, the C-axis controller cannot be used, which severely restricts the range of movement of the electrode and thus, reduces its usefulness in automatically forming a plurality of cavities or dies, as is sometimes desired. Moreover, manually installing and/or removing the external cover is timeconsuming and does not allow for the user to quickly utilize a number of tools with an automatic tool changing system. As such, it is currently not feasible to utilize increase amperages when use of a C-axis controller is desired, as can be typical in unattended operations.

The industry currently lacks a tool adaptor for use with an electrode and an EDM that can utilize increased amperage to quickly form or burn a cavity or die in a workpiece, and the C-axis controller for assisting in forming a plurality of cavities in a workpiece.

SUMMARY OF THE PRESENT INVENTION

It is an object of the present invention to provide a tool adaptor that addresses and overcomes the above-mentioned problems and shortcomings in the electrical discharge machine industry.

It is a further object of the present invention to provide a tool adaptor that decreases cavity formation time and/or tool cycle time.

It is also an object of the present invention to provide a tool adaptor that eliminates the need for an external cover for encasing the C-axis controller.

It is yet another object of the present invention to provide a tool adaptor that can be used to automatically form a plurality of cavities in a workpiece in unattended operations with minimal tool operator involvement.

It is still a further object of the present invention to provide a tool adaptor that can be used with a quick change or automatic changeable tool system.

Yet another object of the present invention is to provide a tool adaptor that effectively thermally and/or electrically isolates the C-axis controller from the electrode, the tool adaptor, and the current source.

It is an object of the present invention to provide a tool adaptor that permits usage of a C-axis controller at increased amperage.

Additional objects, advantages and other features of the invention will be set forth and will become apparent to those skilled in the art upon examination of the following, or may be learned with practice of the invention. To achieve the foregoing and other objects, and in accordance with the purpose herein, the present invention comprises a tool adaptor which can be used with an electrode on electrical discharge machine having a current source and a C-axis controller. The tool adaptor includes a tool holder for selectively and releasably securing the tool adaptor to the C-axis controller, a jig plate adapted for securing the electrode, an isolating assembly, including a spacer, interposed between the tool holder and the jig plate for effectively preventing electrical communication between the jig plate and the tool holder. The tool adaptor also can include an electrical assembly for effectively establishing and maintaining electrical communication between the jig plate and the current source, whereby the tool adaptor is configured to permit selective rotational movement of the electrode. The electrical assembly may comprise a connector adapted for being selectively mountable around the C-axis controller, and being in effective electrical communication with the current source, and one or more elongated shaped shanks (e.g., pins) that are configured and capable of establishing and maintaining effective electrical communication between the connector and the jig plate.

The isolating assembly may further include an isolator channel for selectively and slidably receive the proximal portion of the shank. A jig channel may be provided in a jig plate having an effective outer diameter adapted to selectively and slidably receive the distal portion of the shank.

In a preferred embodiment, the tool adaptor may include a spring positioned between the shank and the jig plate for assisting in effectively establishing and maintaining electrical communication between the connector and the shank.

The proximal portion of the shank and/or the lower surface of the connector may preferably include a surface or assembly configured for enhancing effective electrical communication between the connector and the shank. Surface friction between the lower surface of the connector and the proximal portion of the shank can be minimized, such as by generally providing a rounded end, a ball bearing assembly on the proximal portion of the shank, or a probe extending away from the proximal portion of the shank that is selectively receivable within a groove or tract provided or configured in the lower surface of the connector.

The present invention also includes an improved method for forming a cavity in a workpiece which can include providing an electrical discharge machine with a C-axis controller and, a tool adaptor for mounting an electrode, and an electrode. The electrode can be moved in close proximity to or adjacent the workpiece, and preferably is used for forming a cavity in the workpiece using electrical current in excess of 60 amps, more preferably in excess of 80 amps, and even more preferably in excess of 100 amps. The electrode can be moved away from the workpiece. Without operator assistance, the electrode can be selectively rotated by the C-axis controller. Again, the electrode can be moved in close proximity to the workpiece and a second cavity in the workpiece using electrical current. The process can be repeated without tool operator involvement.

DETAILED DRAWINGS OF THE PRESENT INVENTION

While the specification conclude with claims particularly pointing out and distinctly claiming the present invention, it is believed the same will be better understood from the following description taken in conjunction with the accompanied drawings in which:

FIG. 3A is an enlarged top view of the connector of the tool adaptor illustrated in FIG. 2 further illustrating the details of the connector;

FIG. 3B is a vertical cross-sectional view of the connector of FIG. 3A taken along line 3B—3B thereof;

FIG. 4A is an enlarged top view of the spacer plate of the tool adaptor illustrated in FIG. 2 of the present invention for assisting in effectively electrically and/or thermally isolating the C-axis controller;

FIG. 4B is a vertical cross-sectional view of the spacer plate of FIG. 4A taken along line 4B—4B thereof;

FIG. 4C is an additional horizontal cross-sectional view of the spacer plate illustrated in FIG. 4A taken along line 4C—4C thereof;

FIG. 5A is a top view of the jig plate illustrated in FIG. 2;

FIG. 5B is a horizontal cross-sectional view of the jig plate of FIG. 5A taken along line 5B—5B thereof;

FIG. 5C is another horizontal cross-sectional view of the jig plate of FIG. 5A taken along line 5C—5C thereof;

DETAILED DISCUSSION OF THE INVENTION/ PREFERRED EMBODIMENT

Figure 1:
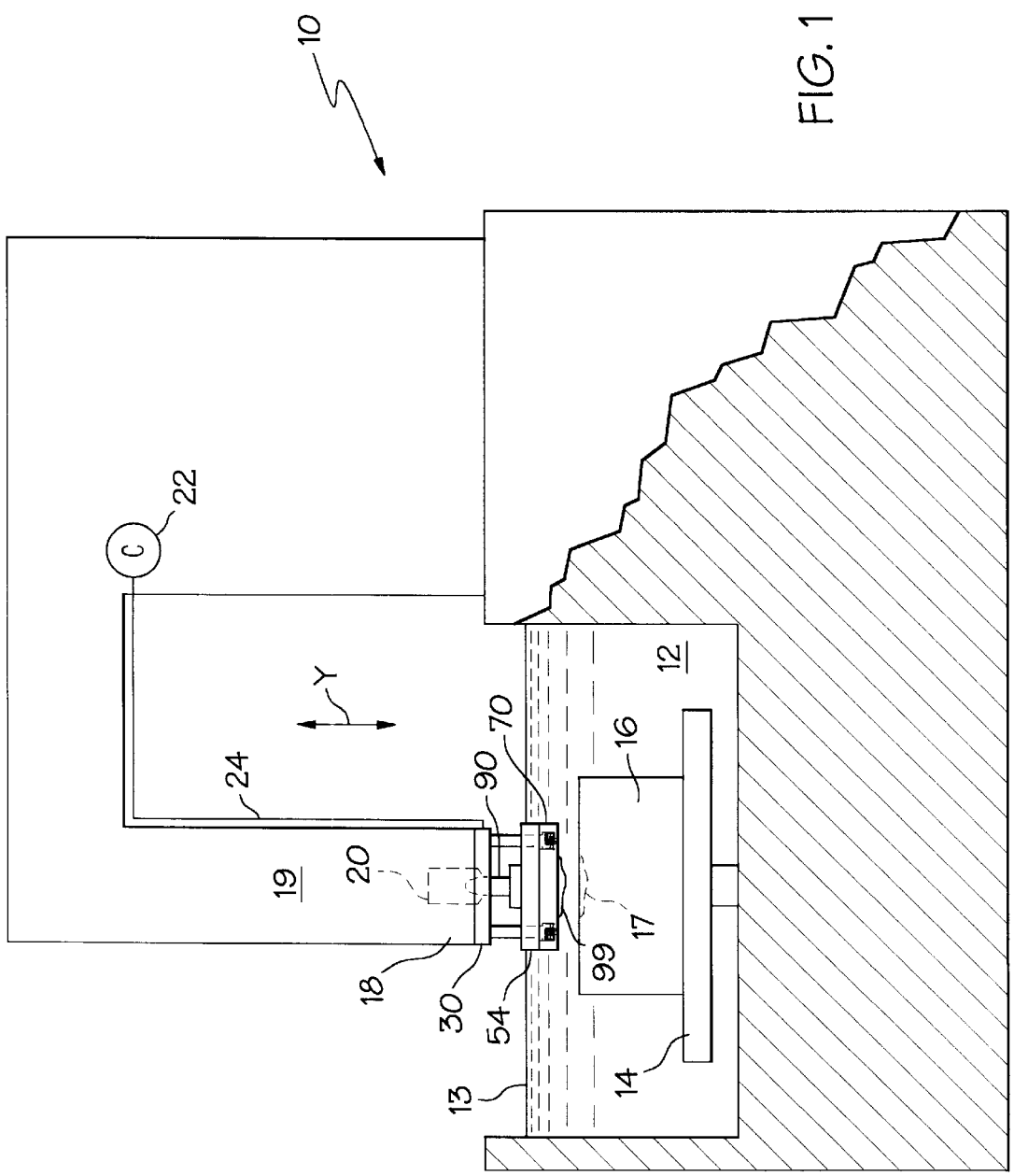
FIG. 1 is a schematic partial sectional view of an EDM station having a ram and a C-axis controller for adjusting the relative position of an electrode relative to a workpiece which can be used for forming cavities in the workpiece.

Referring now to the drawing figures in detail, wherein like numerals indicate the same elements throughout the views, FIG. 1 illustrates an electrical discharge machine (or EDM) 10 station or center which typically comprises a pool or recess 12 for holding fluid 13 used in cavity forming operation and a workhead or workable 14 having a workpiece 16 attached thereto using fixtures and techniques known in the industry. Workpiece 16 is illustrated as a single exemplary structure having a cavity or similar hole 17 that has been formed using an EDM station or center 10.

In operations, the electrode 99 and workpiece 16 generally are moved with respect to each other (See arrow "Y") as the electrode 99 is typically moved into close proximity to or juxtapose the workpiece 16 in order to enable cavity forming operations. As mentioned previously, it is not required that electrode 99 and the workpiece, e.g., 16 touch in order to form a cavity, e.g., 17.

Figure 2:
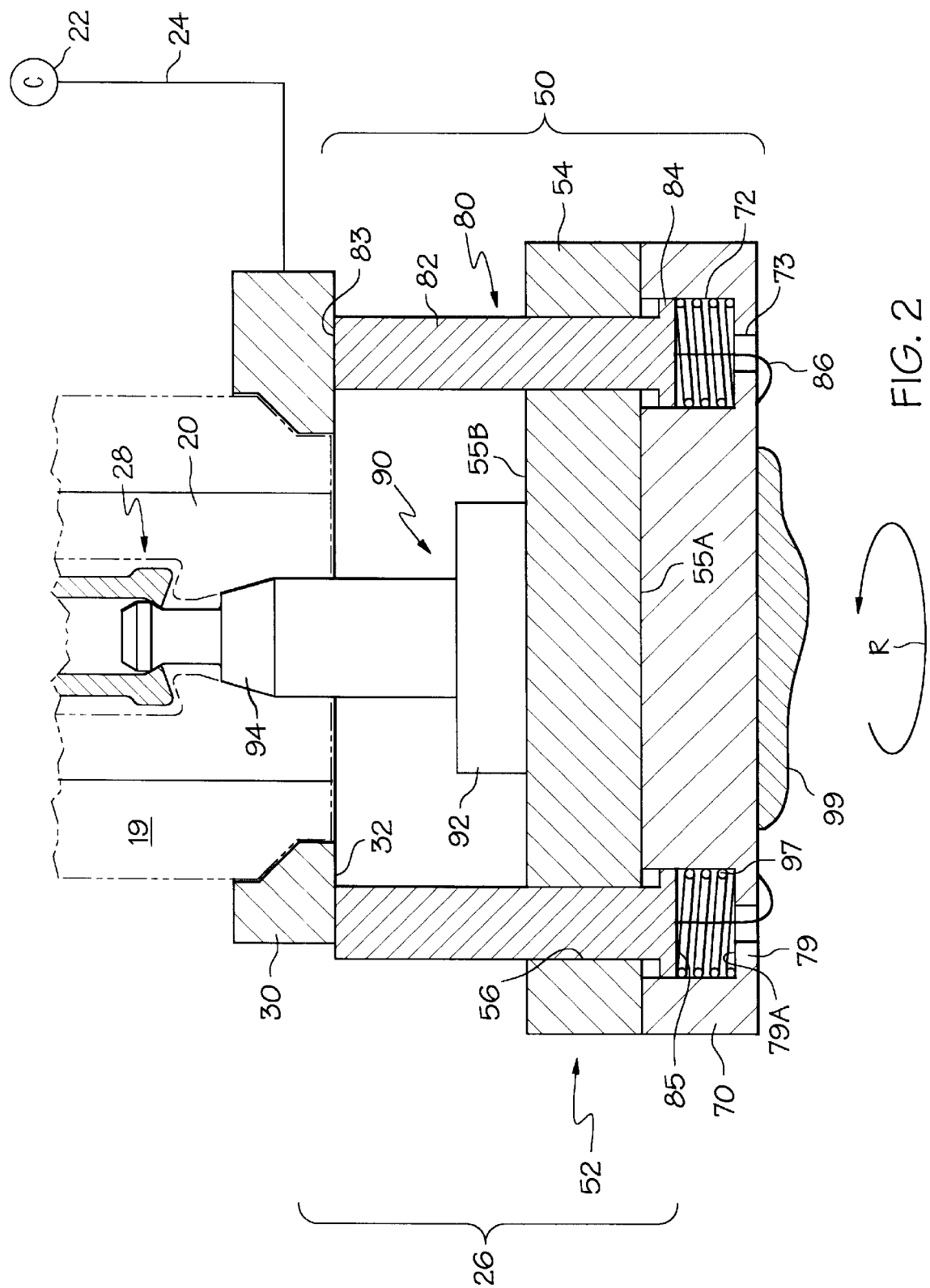
FIG. 2 is a sectional view of one embodiment of the tool adaptor made in accordance with the present invention and illustrating a preferred arrangement of the tool adaptor.
Figure 6C:
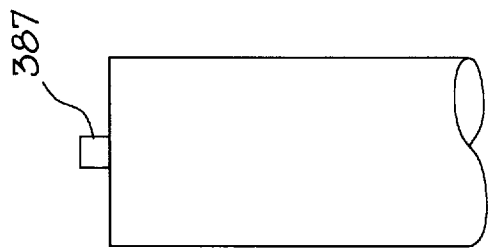
FIG. 6C is a perspective view of yet another alternative embodiment of the distal portion of the shank of the present invention.
Figure 6B:
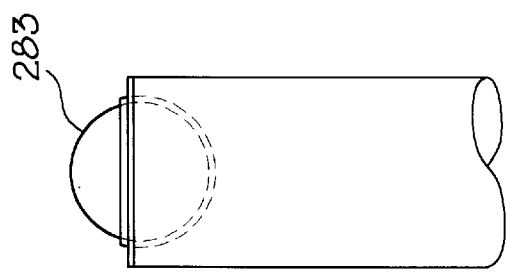
FIG. 6B is a perspective view of a second alternative embodiment of the distal portion of the shank used with the present invention.
Figure 6A:
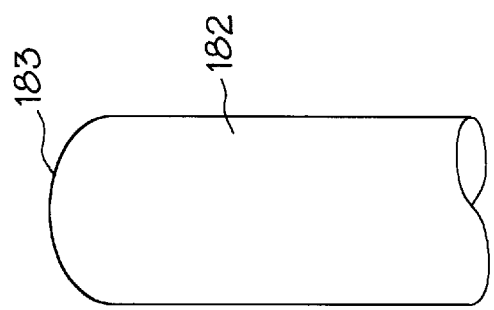
FIG. 6A is a perspective view of an alternative embodiment of the distal portion of the shank.

The present invention preferably is adapted for use with any EDM station or center 10 having a ram 18 for moving an electrode (e.g., 99) vertically and/or horizontally, and a head 19 and a C-axis controller or other device or assembly for rotating an electrode 20 which selectively can rotate the electrode (e.g., 99) to various angular orientations (see arrow "R" in FIG. 2). The C-axis controller 18 is preferably adapted for quickly and easily receiving and securing one of a plurality of tool holders (e.g., 90) for various cavity forming EDM operations.

An EDM station or center 10 typically has a synchronized system, such as an automatic tool changer (not shown) for quickly and easily interchanging and utilizing multiple matching tools in one EDM station or center (i.e., 10), thereby allowing the EDM station 10 to provide greater utility or range of operation (i.e., they are not dedicated to a single operation or use by a single type of tool), and so that it can form cavities in unattended operations (i.e., without tool operator involvement).

Any engaging assembly (see, e.g., 28 in FIG. 2) for clamping or otherwise securing the distal portion of the stem portion 94 of tool holder 90 in a generally cantilevered fashion with the C-axis controller 20, such as a draw bar, a collect, a mandrel device, or other device known in the industry, can be used, so long as the moveable portion of the tool adaptor 50 and/or the electrode 99 can be rotated (see "R") by the C-axis controller 20. A preferred engaging assembly 28 may allow for quick interchange of tools or tool adaptors (e.g., 50) without the need for tool operators manually to hook up or otherwise connect electrical current, or make other modifications to the tool adaptor 50 or the electrode 99. As will be understood by those skilled in the industry, the tool adaptor 50 also can be utilized in conventional applications and dedicated operations as well.

Turning now to FIG. 2, the tool adaptor 50 preferably can include a tool holder 90 adapted for use with an EDM station 10, an isolating assembly 52 having a spacer 54 for effectively thermally and/or electrically isolating the C-axis controller 20, and an electrical assembly 26 for effectively establishing and maintaining electrical communication between the current source 22 and the electrode 99.

FIGS. 3A to 3C illustrate the tool adaptor 50 of the present invention as including a connector 30 as part of the electrical assembly 26, which preferably can be adapted to be received around and connected to the head 19 or other distal portion of ram 18. One or more bore holes 34 having a counterbore portion 35 can be provided through the connector 30 and also in the head 19 (not shown) and preferably are adapted to receive the threaded shank of a bolt or other fastener for releasably securing the connector 30 to the head 19. Alternative, or in conjunction, other similar assemblies known in the industry can be used with the present invention for releasably securing the connector 30 to the head 19. The interior portion 26 of the connector 30 is illustrated as having a first portion 37, second portion 38 and third portion 39, each having varying effective outer diameters. It is noted, however, that the interior portion 36 can be configured in any arrangement of shapes and edges so long as it can be attached or secured to the head 18, or other portion of the ram 19.

The connector 30 is illustrated in FIGS. 2 and 3A–B as having exterior surface 40 with a non-rounded portion 42. It is noted, however, that the exterior surface 40 of the connector 30 can be configured in any arrangement of shapes and edges, as desired, so long as effective electrical communication preferably is established and maintained between the connector 30 and other portion of the electrical assembly 26, such as the shank 80. The outer surface 40 of the connector 30 may be further shaped or configured so that preferably the present invention can be utilized with certain automatic tool changing systems (not shown).

The connector 30 should be sufficiently sized and configured to effectively enable the establishment and maintenance of electrical communication with other components of the EDM station 10 irrespective of the radial position of electrode 99. The surface area of lower surface 32 preferably should be sufficiently sized and/or configured so that effective electrical communication is established and maintained between at least one shank 80 as a portion of the tool adaptor (e.g., 50) is selectively rotated by the C-axis controller 20.

A variety of standard materials available in the industry can be used to form the connector 30 so that it can sufficiently effectively conduct direct electrical current from the current source 22 (e.g., a source of direct current), via a wire 24, to the electrode 99, through, for example, the shank 80, as exemplified in FIG. 2. Illustrative examples of suitable materials which might be used as the connector 30 would include 2024 aluminum or the like.

The tool adaptor 50 also includes a generally standard tool holder 90 having a generally upright stem portion 94 adapted to enable engagement with the engaging assembly 28 of the C-axis controller 20. The tool holder 90 also can include a generally rectangular or otherwise shaped plate portion 92 which can include threaded bore holes (not shown) that is adapted to receive the shank of a threaded bolt or other connector to connectively associate the isolating assembly 52 with the tool holder 90, as best illustrated in FIG. 2. A variety of standard materials available in the industry can be used to form the tool holder 90 so that it is sufficiently durable for repeated use and can provide stability for an electrode 99 and portions of the tool adaptor 50.

Turning now to FIGS. 4A to 4C, the present invention is exemplified as including an isolating assembly 52 which features a spacer 54 that may be interposed between and can be connectively associated with the tool holder 90 and the jig plate 70. A variety of standard materials available in the industry can be used to form the isolating assembly 52 for effectively thermally and/or electrically isolating or separating the tool holder 90 from the current source 22, the connector 30, the jig plate 70 and/or electrode 99. Illustrative examples of materials which might be used include green glass, ceramics, plastics, or the like. For example, a generally rectangular shaped block of green glass having a thickness of about 1" might be preferred so that the mechanisms and assemblies used to assemble the present invention preferably prevent the establishment of effective electrical and/or thermal communication between the C-axis controller 20 and the jig plate 70.

In order to connectively associate the tool holder 90 and the isolating assembly 52, one or more tool holder bore holes 62, which are preferably aligned with corresponding bore holes (not shown) in the plate portion 92, preferably may be provided and can be adapted to allow for the shank of a threaded bolt or other attachment device to be received therein. In the illustrated embodiment, a counterbore 64 preferably can be incorporated at the entrance of tool holder bore hole 62 in the lower surface 55A of the spacer 54 so that a sufficient clearance exists whereby the bolt or another attachment device, which may be made of an electrical and/or heat conducting material such as metal, does not effectively touch the jig plate 70 and thus, cannot serve as a conduit to establish effective electrical and/or thermal communication between the electrode 99 and the C-axis controller 20 through the jig plate 70 and the tool holder 90.

In addition to tool holder bore hole 62, the illustrated embodiment features the spacer 54 as including one or more jig plate bore holes 58, each of which preferably are aligned with a corresponding bore hole 74 in jig plate 70 (see FIGS. 5A and 5B). Again, jig plate bore holes 58 and the corresponding bore holes 74 preferably can be adapted to enable receipt of the shank of a threaded bolt to connectively associate the spacer 54 and the jig plate 70 together. The illustrated embodiment features a corresponding counterbore 60 that may be incorporated at the entrance of the jig plate bore hole 58 in upper surface 55B of the spacer 54 to enable a sufficient clearance between the bolt and the jig plate 70 so that the bolt or other attachment device does not effectively touch the tool holder 90 and thus, cannot serve as a conduit to establish effective electrical and/or thermal communication between the C-axis controller 20 and electrode 99.

Isolating assembly 52 also may include one or more isolator channels 56 adapted to slidably receive a shank 80 or other elongated object, such as the generally cylindrical configured pin illustrated in FIG. 2. The diameter of isolator channel 56 should be approximately the same diameter as the effective outer diameter of the first portion 82 of the shank 80.

The lower surface 55A of isolating assembly 52 also features one or more small shaped pins 66 which are adapted to be snugly received in the recess 76 of jig plate 70, as exemplified in FIGS. 5A and 5C, to assist in properly and effectively aligning the jig plate 70 and the isolating assembly 52.

Turning now to FIGS. 5A to 5C, the tool adaptor 50 of the present invention also may feature a standard jig or electrode holding plate 70 for holding or mounting an electrode 99. The jig plate 70 of the present invention can feature one or more bore holes 74 adapted to receive the distal portion of a shank of a threaded bolt or other connection device to assist in connectively associating the jig plate 70 to the spacer 54. Jig plate 70 also may include jig channel 71 having at least a first or upper portion 72 and a second or lower portion 73. First portion 72 preferably has an effective outer diameter corresponding to the effective outer diameter of the second portion 84 of the shank 80 (see FIG. 2). Moreover, the effective outer diameter of jig channel 71 is typically greater than the effective outer diameter of the isolating channel 56 so that shank 80 can be slidably movable through isolating channel 56, however, the second portion 84 of the shank 80, together with the change in effective outer diameter between the isolating channel 56 and the jig channel 71 effectively prevents the shank 80 from being slidably removable from the isolating channel 56 while jig plate 70 and spacer 54 are connectively associated.

The second or lower portion 73 of jig channel 71 preferably features a smaller effective outer diameter than the effective outer diameter of the first or upper portion 72, and an opening 75 in the lower surface 78. The change in effective outer diameter between the first and second portions 72 and 73, respectively, preferably is accomplished by providing an annular shaped shelf portion 79 having an upper or first surface 79A, as best illustrated in FIGS. 2 and 5B. Turning back now to FIG. 2, the upper surface 79A should have sufficient surface area so that a spring 97, or other suitable biasing mechanism, can be positioned between the axial face 85 of the shank 80 and the upper surface 79A of the shelf portion 79. Spring 97 should have sufficient force to assist in enabling establishment and/or maintenance of effective electrical communication between the top or axial surface 83 of shank 80 and the lower surface 32 of the connector 30. Moreover, the effective outer diameter decrease between first and second portions 72 and 73, respectively, that provides the shelf portion 79 also can preferably present shank 80 from being slidably removable from jig channel 71.

Turning now to FIG. 2 and FIGS. 6A–6C, the tool adaptor 50 of the present invention can feature one or more shanks 80, such as a generally elongated (e.g., cylindrical shaped) pin apparatus for effectively establishing and maintaining electrical communication between the current source 22 and the electrode 99. Shank 80 can have a first portion 82 with an effective outer diameter configured to be slidably moveable through isolating channel 56, and a second portion 84, having an effective outer diameter configured to be slidably movable through jig channel 71. Second portion 84 preferably has a larger effective outer diameter than the first portion so that the shank 80 remains slidably positioned in channels 56 and 71. A variety of standard materials available in the industry can be used for the shank 80 so that it effectively routes or conducts direct current from the connector 30 to the jig plate 70.

The axial surface 83 of first portion 82 preferably can be configured to enhance maintaining effective electrical communication between the shank 80 and the lower surface 32 of the connector 30. Illustrative examples include a substantially flat surface 83 (see e.g., FIG. 2), a rounded surface 183 (see e.g., FIG. 6A), a ball bearing assembly 283 affixed in the axial face (see e.g., FIG. 6B), or a probe 387 that is configured to be received in a slot or groove in lower surface (e.g., 32).

A wire 86 or other mechanism can be provided to assist in establishing or enhancing effective electrical communication between the shank 80 and the jig plate 70. The wire 86 preferably extends through the opening 75 in jig channel 71, and can be attached to the lower surface 77 of the jig plate 70 and the shank 80 using techniques and assemblies known in the industry, such as soldering, a pin or screw. Alternatively, the wire 86 can be connected to the second portion 73 as long as it does not interfere with the operations and movements of the spring 97 and the shank 80.

An electrode (e.g., 99) corresponding to the desired size, shape and/or pattern of the desired cavity (e.g., 17) or opening in the workpiece 16 can be utilized with the present invention, and attached to the jig plate 70 using techniques and assemblies known in the industry. Graphite preferably can be used as a material for electrode 99 as it is highly conductive and does not melt at increased temperatures which can be desired in certain usages. Alternatively, other metal conducting materials capable of being formed in the desired size, shape and configuration of an electrode can be used, such as copper. The electrode 99 can be formed using standard techniques in the industry so that it can be provided in the shape of the ultimately produced part, and can include highly accurate contours to provide exacting surface finishes.

In use, the stem portion 94 of tool holder 90 can be inserted and received within the engaging assembly 28, as discussed above. Effective electrical communication is established between the connector 30 and jig plate 70 via one or more shanks 80. Preferably, spring 97 can assist in pushing or otherwise forcing the axial surface 83 of shank 80 in effective electrical communication and/or engagement with the lower surface 32 of the connector 30.

Referring back to FIG. 1, electrode 99 can be automatically (e.g., without tool operator involvement) lowered into close proximity to or adjacent the workpiece 16 to be worked. Typically, however, the workpiece 16 and electrode 90 do not touch, as illustrated. Direct current can be routed automatically from the current source 22, via wire 24, through the tool adaptor (e.g., 50) of the present invention and eventually to the electrode 99 to provide the desired cavity or opening (e.g., 17). Once this step is completed, the electrode 99 can be automatically moved away from the workpiece by the ram 19 of the EDM station or center 10, automatically selectively rotated by the C-axis controller 20 and automatically moved into close proximity to or adjacent another portion of the workpiece 16 to form another cavity or opening in the workpiece.

It is contemplated that the present invention can be used with direct current amperage levels in excess of about 60 amps, preferably in excess of about 80 amps, and even more preferably in excess of about 100 amps without damaging or otherwise harming the C-axis controller 20 as a result of the C-axis controller 20 being effectively electrically and/or thermally isolated from the electrical current utilized with the EDM station 10, and/or the residual thermal energy discharge created as a result of the cavity forming operation.

Having shown and described the preferred embodiments of the present invention in detail, it will be apparent that modification and variations by one of ordinary skill in the art are possible without departing from the scope of the present invention defined by the appended claims. Several potential modifications have been mentioned and others will be apparent to those skilled in the art. For example, electrical communication can be established between the connector (e.g., 30) or source (e.g., 22) via the shank 80 which can extend around isolating assembly 52 instead of therethrough via isolating channels 56. Accordingly, the scope of the present invention should be considered in terms of the following claim and is understood not to be limited to the details of structure and operation shown and described in the specification and drawings.

What is claimed is:

1. A tool adaptor for use with an electrode on electrical discharge machine having a current source and a C-axis controller, said tool adaptor comprising:
   a tool holder for selectively and releasably securing the electrode to the C-axis controller;
   a jig plate adapted for securing the electrode;
   an isolating assembly interposed between said tool holder and said jig plate, said isolating assembly effectively preventing electrical current flow between said jig plate and said tool holder; and
   an electrical assembly for effectively establishing and maintaining electrical current flow between said jig plate and the current source, whereby said tool adaptor is configured to permit selective rotational movement of the electrode using the C-axis controller.

2. The tool adaptor of claim 1, wherein said isolating assembly comprises a spacer.

3. The tool adaptor of claim 1, wherein said electrical assembly comprises:
   a connector adapted for being selectively mountable around said C-axis controller, said connector being in effective electrical current flow with the current source; and
   a shank being capable of effectively establishing and maintaining electrical current flow between said connector and said jig plate.

4. The tool adaptor of claim 2, wherein said shank having a proximal portion and a distal portion, each of said proximal and distal portions having an effective outer diameter, the effective outer diameter of said proximal portion being less than the effective outer diameter of said distal portion.

5. The tool adaptor of claim 4, wherein said isolating assembly comprises an isolator channel adapted to selectively and slidably receive said proximal portion of said shank.

6. The tool adaptor of claim 5, wherein said jig plate comprises a jig channel, said jig channel having an effective outer diameter adapted to selectively and slidably receive the distal portion of said shank.

7. The tool adaptor of claim 2, wherein said electrical assembly comprises a spring positioned between said shank and said jig plate for assisting in establishing and maintaining effective electrical current flow between said connector and said shank.

8. The tool adaptor of claim 4, wherein said proximal portion of said shank comprises a surface configured for maintaining effective electrical current flow between the lower surface of said connector and said proximal portion of said shank while said electrode is selectively rotated by the C-axis controller.

9. The tool adaptor of claim 8, wherein said proximal portion of said shank comprises a ball bearing assembly.

10. The tool adaptor of claim 8, wherein said shank comprises a third portion and said lower surface of said connector comprises a groove adapted to receive said third portion.

11. The tool adaptor of claim 8, wherein said proximal portion of said shank comprises a rounded end.

12. The tool adaptor of claim 8, wherein said proximal portion of said shank comprises a substantially flat end.

13. A tool adaptor for use with a C-axis controller on an electrical discharge machine having a current source, said adaptor comprising:
    means for securing said tool adaptor to the C-axis controller;
    means for delivering current from the current source to an electrode secured to a jig plate;
    means for electrically isolating the C-axis controller from the jig plate; and
    means for allowing rotational movement of the C-axis controller.

14. The tool adaptor of claim 13, comprising means for establishing electrical current flow between the current source and said delivering means.

15. The tool adaptor of claim 13, comprising means for establishing and maintaining electrical current flow between the current source and said delivering means.

* * * * *

UNITED STATES PATENT AND TRADEMARK OFFICE
CERTIFICATE OF CORRECTION

PATENT NO. : 5,847,348
DATED : December 8, 1998
INVENTOR(S) : Samuel J. Allison

It is certified that error appears in the above-identified patent and that said Letters Patent is hereby corrected as shown below:

Column 10, line 8, replace "2" with --3--.
Column 10, line 21, replace "2" with --3--.

Signed and Sealed this

Sixth Day of April, 1999

Q. TODD DICKINSON

Attest:

Attesting Officer

Acting Commissioner of Patents and Trademarks